J. B. Moody.
Cultivator.
N° 89,422. Patented Apr. 27, 1869.

Witnesses,
Wm A Magan
G. C. Cotton

Inventor,
J. B. Moody
per Munn & Co
Attorneys

UNITED STATES PATENT OFFICE.

JOSEPH B. MOODY, OF PEMBROKE, KENTUCKY.

Letters Patent No. 89,422, dated April 27, 1869.

IMPROVEMENT IN CULTIVATORS.

The Schedule referred to in these Letters Patent and making part of the same.

*To all whom it may concern:*

Be it known that I, JOSEPH B. MOODY, of Pembroke, in the county of Christian, and State of Kentucky, have invented a new and useful Improvement in Cultivators; and I do hereby declare that the following is a full, clear, and exact description thereof, which will enable others skilled in the art to make and use the same, reference being had to the accompanying drawings, forming a part of this specification.

Similar letters of reference indicate corresponding parts.

My invention has for its object to improve the construction of cultivators, so as to make them more convenient and effective in operation, at the same time that they are made strong and simple in construction; and It consists in the construction of the teeth, or plows, and adjustable draught-bar and clevis, and in their combination with the frame of the cultivator, as hereinafter more fully described.

A is the frame of the cultivator, the side-bars $a^1$ of which are pivoted or hinged at their forward ends to the sides of the central bar $a^2$, near its forward end, so that the rear ends of said side-bars $a^1$ may be adjusted further from or nearer to the said central bar $a^2$, according to the distance apart of the rows of plants to be cultivated.

B are metallic bars or straps, the outer ends of which overlap and are secured to the outer sides of the rear parts of the side-bars $a^1$ of the cultivator-frame A.

The inner parts of the bars B pass through a keeper, C, attached to the upper side of the central bar $a^2$, and have numerous holes formed through them, through one or the other of which, and through the keeper C, passes a pin, or bolt, which passes into the bar $a^2$ of the cultivator-frame, securing the bars $a^1$ securely in the position into which they have been adjusted.

D are the handles, the lower ends of which are attached to the opposite sides of the central bar $a^2$, and the upper parts of which are attached to the ends of the cross-bar E, attached to the upper end of the standard F, the lower end of which is attached to the central bar $a^2$ of the cultivator-frame A.

G are the single cultivator-teeth, or plows, each of which is made in one piece.

The upper ends of the standards of the plows, or teeth G, are made in the form of a cross-head, $g'$, which extends longitudinally along the side-bars $a^1$, is let into recesses formed in the under sides of the said side-bars $a^1$, and is secured in place by bolts or screws passing through holes in the said cross-heads, and passing through or into the said bars $a^1$.

The lower part of the standards, or shanks of the teeth, or plows G, is twisted and bent, or curved outward and forward, is made broad, and has an inclined cutting-edge formed upon it, which passes beneath the ground, and cuts off the weeds and grass before the ground is raised and turned by the curved parts of said teeth, or plows G.

The central plow, or tooth H, is made with two cutting-edges, and is attached to the rear part of the central bar $a^2$ of the cultivator, between or nearly between the two rear side teeth, or plows G, by means of a cross-head, $h$, formed upon the upper end of its standard, which is let into and secured to the said bar $a^2$ in the manner hereinbefore described with reference to the side teeth, or plows G.

Figure 2:
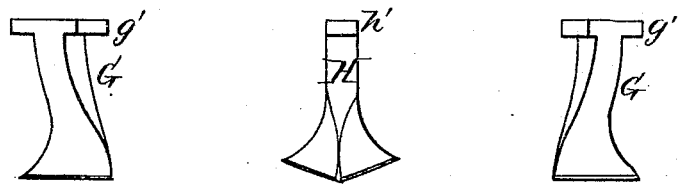
Figure 2 is a detail front view of the three rear teeth, or plows, arranged in their proper relative positions.

The relative position of the central tooth, or plow H, and the two rear side teeth, or plows G, is shown in fig. 2.

The two front teeth, or plows G, are attached to the forward parts of the side-bars $a^1$ in such positions that they may be directly in front of the spaces between the central tooth H and the rear side teeth G, so that the whole of the ground over which the cultivator passes may be operated upon.

I is the draught-bar, the rear end of which is connected to the middle part of the central bar $a^2$ of the cultivator-frame A, by a strong staple, eye-bolt, or similar connection.

The forward end of the draught-bar, or rod I, passes through the vertical clevis J, and has a spiral hook formed upon its end for the attachment of the draught.

The lower ends of the arms of the clevis J are securely attached to the sides of the forward end of the central bar $a^2$ of the cultivator-frame A.

Figure 1:
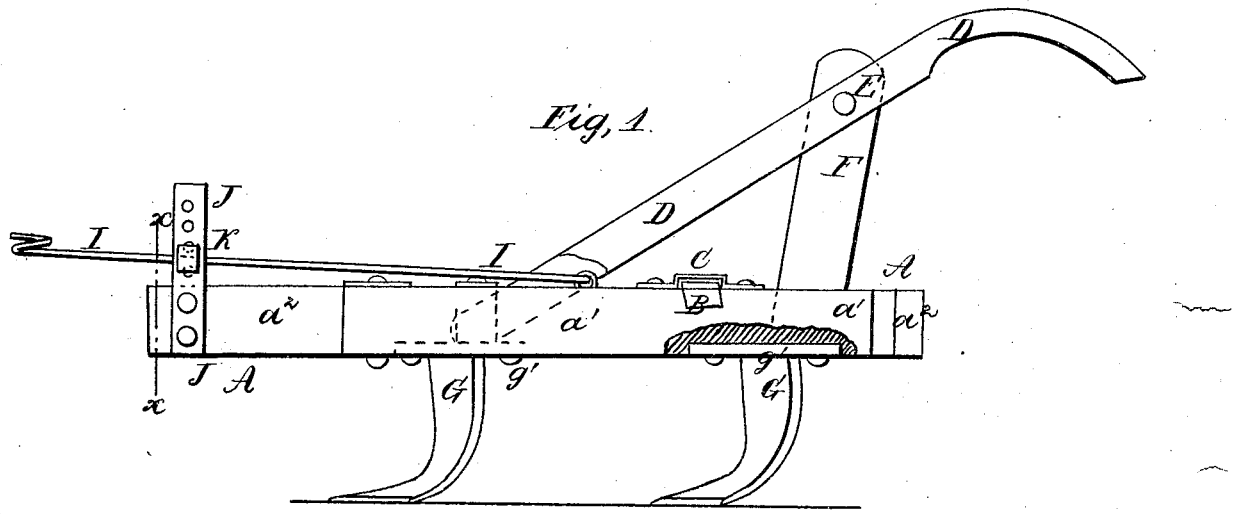
Figure 1 is a side view of a cultivator to which my improvements have been attached.
Figure 3:
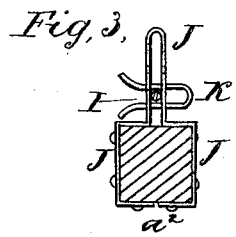
Figure 3 is a detail sectional view, taken through the line $x\,x$, fig. 1.

The middle part of the clevis extends upward vertically in such a way as to leave a sufficient space between its two parts, or arms, to receive the draught-rod, or bar I, which is secured at any desired elevation to which it may be adjusted by the key or bolts K, which passes or pass through holes in the said clevis J, upon each side of the said draught-bar I, as shown in figs. 1 and 3.

This construction and arrangement of the draught-bar, or rod, and clevis, enable the said draught-rod to be so adjusted that the cultivator may run at any desired depth in the ground, and at the same time be drawn steadily at whatever depth it may be adjusted to run.

Having thus described my invention,

What I claim as new, and desire to secure by Letters Patent, is—

The cultivator-teeth, or plows G, constructed and attached to the frame A, substantially in the manner herein shown and described, and for the purpose set forth.

The above specification of my invention signed by me, this 7th day of July, 1868.

JOS. B. MOODY.

Witnesses:
ALEX. F. ROBERTS,
JAMES T. GRAHAM.